Figure 1:
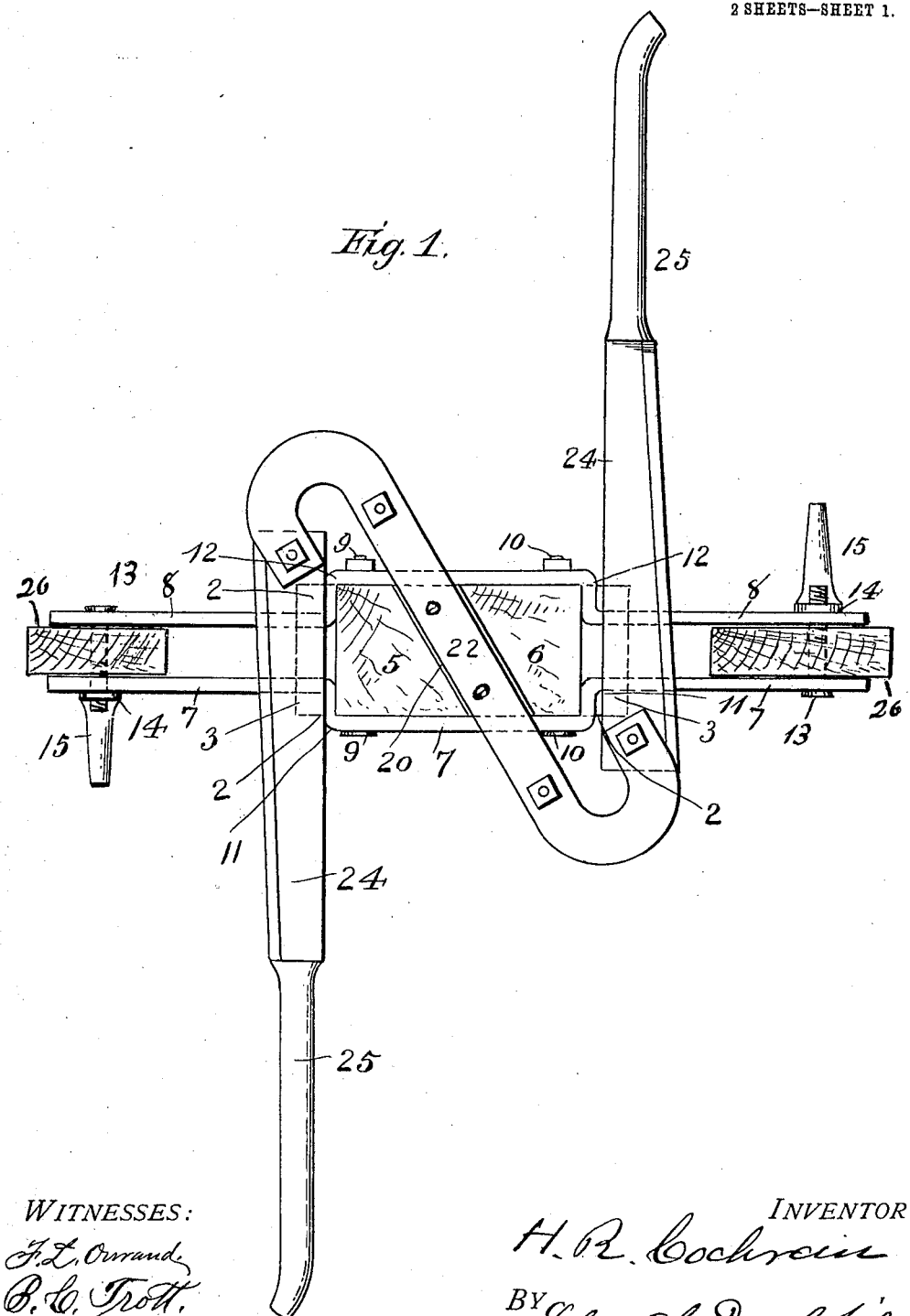

No. 871,324. PATENTED NOV. 19, 1907.
H. R. COCHRAN.
WEDGE MAKING MACHINE.
APPLICATION FILED MAY 27, 1907.

2 SHEETS—SHEET 1.

WITNESSES:

INVENTOR
H. R. Cochran
BY
Attorney

No. 871,324. PATENTED NOV. 19, 1907.
H. R. COCHRAN.
WEDGE MAKING MACHINE.
APPLICATION FILED MAY 27, 1907.
2 SHEETS—SHEET 2.
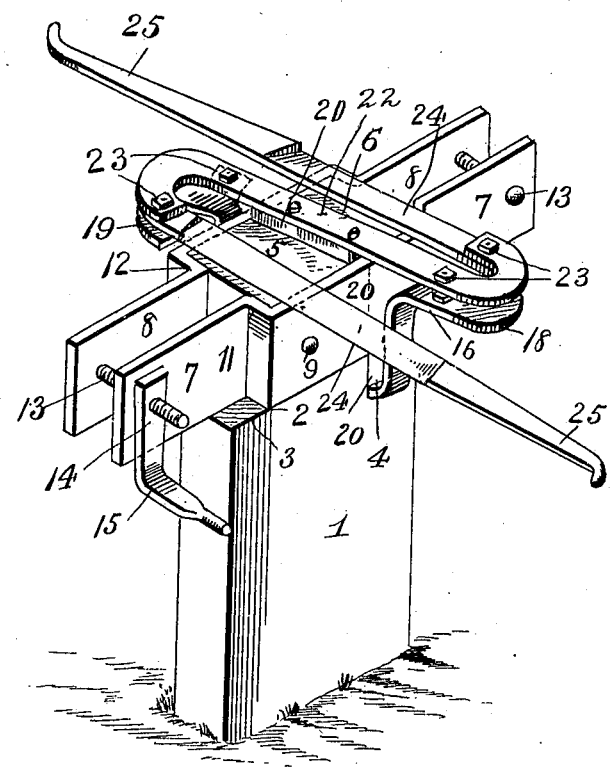
Fig. 2.
Fig. 3.
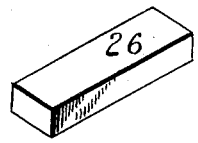
Fig. 4.
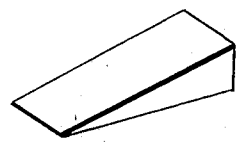
Fig. 5.
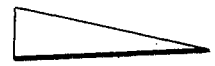
WITNESSES:
F. L. Ourand.
P. C. Trott.
INVENTOR
H. R. Cochran
BY
John S. Duffie
Attorney

UNITED STATES PATENT OFFICE.

HENRY RUSSELL COCHRAN, OF CAMDEN, ARKANSAS.

WEDGE-MAKING MACHINE.

No. 871,324.　　　Specification of Letters Patent.　　Patented Nov. 19, 1907.

Application filed May 27, 1907. Serial No. 376,009.

*To all whom it may concern:*

Be it known that I, HENRY RUSSELL COCHRAN, citizen of the United States, residing at Camden, in the county of Ouachita and State of Arkansas, have invented certain new and useful Improvements in Wedge-Making Machines, of which the following is a specification.

My invention is a machine for making wooden wedges to be driven after cross-cut saws in sawing lumber of any kind, as metal wedges cannot be safely used in this work. Both tapering faces of the wedge should be perfectly smooth and straight, tapering from the blunt end inwardly to an edge. These wedges are made of wood, and can be quickly and accurately made by my machine.

In the accompanying drawings, Figure 1, is a top plan view of my invention. Fig. 2, is a perspective view. Fig. 3, is a perspective view of a block of wood, from which the wedge is made. Fig. 4, is a perspective view of the wedge. Fig. 5, is an edge view of the wedge.

Similar numerals refer to similar parts throughout the several views.

In describing my invention I read the drawing from left to right.

My invention is described as follows:—In the accompanying drawings the numeral 1, is an upright post. This post in cross section is rectangular in shape. The top of the post is level, except it is provided at each end with a recess 2, leaving projections 3. These projections form rests for the arms hereinafter described. Cut at an angle in the top of the post and running downwardly a considerable depth is a slot 4; running upwardly from the recesses 3, are a couple of upward projections 5 and 6. Secured on each side of these projections are clamps 7 and 8. These clamps are secured to the upward projections 5 and 6, by bolts and nuts 9 and 10. The clamps 7 and 8, extend outwardly from the post 1, by being bent inwardly and outwardly by double elbows 11 and 12. Passing through the outer ends of these clamps are perforations in which work threaded bolts 13, and screwing on the ends of said threaded bolts 13, are clamping nuts 14, provided with lever arms 15. A bearing 16, U shaped in its middle, and U shaped at each end 18, and having vertical perforations near each end, is seated in said slot. The right-hand end 18, of said lower bearing, turns backwardly and inwardly in the direction of said post and is perforated at its extreme end. The left-hand end 19, of said lower bearing turns forwardly and inwardly in the direction of said post and is perforated at its extreme end. Then a wedge 20, is driven tightly down into said slot 4, to hold said lower bearing 16, in place, the upper end of which extends a little above the ends of the projections 5 and 6. Secured on the upper end of said wedge 20, is an upper bearing 22. This upper bearing is somewhat U shaped and has in each end two perforations. The fact that the said upper bearing 22, rests on the upper end of the wedge 20, leaves a space between said upper and lower bearings, and these bearings are held thus apart by space nuts and bolts 23. Hinged in the extreme ends of said bearings are knives 24. These knives are ground to a sharp edge and are provided with handles 25. Blocks of wood 26, are placed, one between each pair of the clamping arms 7 and 8, shown in Fig. 1, at the desired angle to form one side of a wedge. Then the clamping nuts 14, are screwed down until the said blocks are securely held. The knives are then operated, and cut off one side of the block at the proper angle. Then the other side of the block is turned up, operated in the same way, and the wedge is formed.

With this machine accurate work can be rapidly done. Two men may work at the machine at once, one at each end, and help may feed the machine with the blocks, and remove the wedges from the machine.

Although I have specifically described the combination, construction and arrangement of the several parts of my invention, I do not confine myself particularly to such specific combination, construction and arrangement, as I claim the right to make such changes and modification therein as may clearly fall within the scope of my invention, and which may be resorted to without departing from the spirit, or sacrificing any of my patentable rights therein.

Having described my invention, what I claim as new and desire to secure by Letters Patent, is:—

1. A wedge making machine consisting of an upright post, provided at its upper end with recesses 2, producing projections 3; a vertical slot 4, cut downwardly in the upper end of said post, thus leaving projections 5 and 6, one on each side of said slot; a lower bearing 16, having its U shaped part seated in said slot, its ends 18 and 19, turned up; a wedge 20, driven down in said slot 4, its upper end remaining a little above the upper surfaces or projections 5 and 6; an upper bearing 22, secured on the upper end of said wedge, said bearing being held apart by bolts and nuts 23; knives 24, hinged in the extreme ends of said bearings; clamping arms 7 and 8, secured to the projections 5 and 6, their ends extending beyond the edges of said posts; threaded bolts, passing horizontally through the extreme ends of said clamping arms; clamping nuts, screwing on the threaded ends of said bolts, said arms adapted to clamp and hold a block while operated on by said knives, substantially as shown and described and for the purposes set forth.

2. A wedge making machine consisting of an upright post 1, provided with a vertical slot 4, cut downwardly in the upper end of said post; a lower bearing 16, having ends 18 and 19, turned up and secured to said post by means of a wedge driven in said slot; an upper bearing 22, secured on the upper end of said wedge; bolts and nuts 23, holding said bearings apart; knives 24, hinged between the extreme ends of said bearings; clamping arms 7 and 8, secured to the upper end of said post, their ends extending beyond the edges thereof; threaded bolts, extending horizontally through the extreme ends of said clamping arms, and clamping nuts screwing on the threaded ends of said bolts, said arms adapted to clamp and hold a block while operated on by said knives, substantially as shown and described and for the purposes set forth.

In testimony whereof I affix my signature, in presence of two witnesses.

HENRY RUSSELL COCHRAN.

Witnesses:
HUGH A. PICKETT,
WILLIAM L. SCHWEDLER.